(12) United States Patent
Yin (10) Patent No.: US 10,248,715 B2
(45) Date of Patent: Apr. 2, 2019

(54) MEDIA CONTENT RECOMMENDATION METHOD AND APPARATUS

(71) Applicant: TENCENT TECHNOLOGY (SHENZHEN) COMPANY LIMITED, Shenzhen, Guangdong (CN)

(72) Inventor: Chengguo Yin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 336 days.

(21) Appl. No.: 15/205,456

(22) Filed: Jul. 8, 2016

(65) Prior Publication Data

US 2016/0321355 A1 Nov. 3, 2016

Related U.S. Application Data

(63) Continuation of application No. PCT/CN2015/075541, filed on Mar. 31, 2015.

(30) Foreign Application Priority Data

Apr. 1, 2014 (CN) .......................... 2014 1 0129899

(51) Int. Cl.
*G06F 17/30* (2006.01)

(52) U.S. Cl.
CPC .... *G06F 17/30663* (2013.01); *G06F 17/3097* (2013.01); *G06F 17/30622* (2013.01); *G06F 17/30699* (2013.01); *G06F 17/30864* (2013.01)

(58) Field of Classification Search
CPC ................................................ G06F 17/30663
See application file for complete search history.

(56) References Cited

U.S. PATENT DOCUMENTS 8,892,422 B1 * 11/2014 Kumar ............... G06F 17/2775
704/1
9,020,924 B2 * 4/2015 Wu ..................... G06F 17/3064
706/12

(Continued)

FOREIGN PATENT DOCUMENTS

| CN | 101814073 A | 8/2010 |
| CN | 103425687 A | 12/2013 |
| CN | 103440253 A | 12/2013 |

OTHER PUBLICATIONS

International Search Report for International Application No. PCT/CN2015/075541 dated Jun. 2, 2015 in 2 pages.

(Continued)

*Primary Examiner* — Kris E Mackes
(74) *Attorney, Agent, or Firm* — Knobbe Martens Olson & Bear LLP (57) ABSTRACT

A media content recommendation method includes: receiving an input entry parameter, and performing word segmentation on the entry parameter to obtain a word sequence; combining adjacent words in the word sequence to generate a mixed word sequence; acquiring phrases included in the word sequence and the mixed word sequence, and separately allocating a corresponding matching weight coefficient to a phrase; searching for media content including the phrase, acquiring a matching weight coefficient sum of phrases included in the found media content, and screening the found media content according to matching weight coefficient sums and performing recommendation. In addition, a media content recommendation apparatus is also provided.

21 Claims, 3 Drawing Sheets

(56) References Cited

U.S. PATENT DOCUMENTS

2008/0168032 A1* 7/2008 Criou ................ G06F 17/30675
2016/0070803 A1* 3/2016 Nuckolls ............. G06F 17/3069
                                                                                         707/730

OTHER PUBLICATIONS

International Preliminary Report on Patentability for International Application No. PCT/CN2015/075541 dated Oct. 4, 2016 in 4 pages.
Office Action with Concise Explanation of Relevance for Chinese Application No. 201410129899.7 dated Jul. 23, 2018.

* cited by examiner

MEDIA CONTENT RECOMMENDATION METHOD AND APPARATUS

CROSS-REFERENCE TO RELATED APPLICATIONS

This application is a continuation of, and claims priority to, International Application No. PCT/CN2015/075541, filed on Mar. 31, 2015. This application further claims priority to Chinese Application No. 201410129899.7, filed on Apr. 1, 2014. The entire disclosures of each of the above applications are incorporated herein by reference for all purposes.

BACKGROUND

Field of the Technology

The present disclosure relates to the field of Internet technologies, and in particular, to a media content recommendation method and apparatus.

Description of Related Art

When a user clicks on a video to watch during visit of a video website, a sidebar of a player usually displays a link of a video highly related to the video being played, so as to recommend, to the user, a video highly matching browsing interest of the user. However, when a content website (such as a video website, a forum, or a novel website) in the conventional technology recommends media content to a user, matching of some new vocabularies (such as a meow star folk and a woof star folk) is not considered; and therefore, recommendation accuracy is low.

SUMMARY

Based on this, it is necessary to provide a media content recommendation method that can improve recommendation accuracy.

A media content recommendation method includes: receiving an input entry parameter, and performing word segmentation on the entry parameter to obtain a word sequence; combining adjacent words in the word sequence to generate a mixed word sequence; acquiring phrases included in the word sequence and the mixed word sequence, and allocating a corresponding matching weight coefficient to each phrase; and searching for media content including the phrase, acquiring a matching weight coefficient sum of phrases included in the found media content, and screening the found media content according to the matching weight coefficient sum and performing recommendation.

In addition, it is also necessary to provide a media content recommendation apparatus that can improve recommendation accuracy.

A media content recommendation apparatus includes: an entry input module, configured to receive an input entry parameter, and perform word segmentation on the entry parameter to obtain a word sequence; a word mixing module, configured to combine adjacent words in the word sequence to generate a mixed word sequence; a coefficient allocation module, configured to acquire phrases included in the word sequence and the mixed word sequence, and allocate a corresponding matching weight coefficient to each phrase; and a searching and matching module, configured to search for media content including the phrase; acquire a matching weight coefficient sum of phrases included in the found media content; and screen the found media content according to the matching weight coefficient sum and perform recommendation.

In the foregoing media content recommendation method and apparatus, word segmentation is first performed on an input entry parameter by using a common word segmentation means, and words are then mixed by connecting adjacent words to generate a new word. When corresponding media content is matched according to a phrase extracted from the entry parameter, not only relevance between word segmentation and the media content is considered, but also relevance between a new word generated after mixing and the media content is considered. In this way, in a media field having many new network vocabularies, media content that is highly related to entry information including a new word and also includes the new word can also be recommended to a user. Therefore, compared with a solution in the conventional technology in which only simple word segmentation is used as matching reference, recommendation accuracy is improved.

BRIEF DESCRIPTION OF THE DRAWINGS

The aforementioned features and advantages of the disclosed embodiments as well as additional features and advantages thereof will be more clearly understood hereinafter as a result of a detailed description of preferred embodiments when taken in conjunction with the drawings.

The following briefly describes the accompanying drawings included for describing the embodiments or the prior art. The accompanying drawings in the following descriptions merely show some embodiments, and persons of ordinary skill in the art can derive other drawings from these accompanying drawings without creative efforts.

DETAILED DESCRIPTION

In order to make the objectives, technical solutions, and advantages of the present disclosure more comprehensible, the present disclosure is described in further detail below with reference to accompanying drawings and embodiments. It should be understood that, the specific embodiments described herein are merely used to explain the present disclosure, but are not intended to limit the present disclosure.

In this embodiment, a media content recommendation method is provided. This method may rely on a computer program, and can run in a computer system based on the Von Neumann architecture. The computer system may be an application server that provides a media content on-demand service, and is, for example, a website server or an application server of a video on-demand website, an online reading website, or a forum. An application scenario thereof is usually that a video or a posting highly related to media content being browsed is found from a video database or a posting database according to a title of a video or a title of a forum posting being browsed by a user, and is delivered to a video player or a browser; and the video player or the browser may display a link or abbreviated information of the related video or posting in an area such as a sidebar of the player or a webpage.

Figure 1:
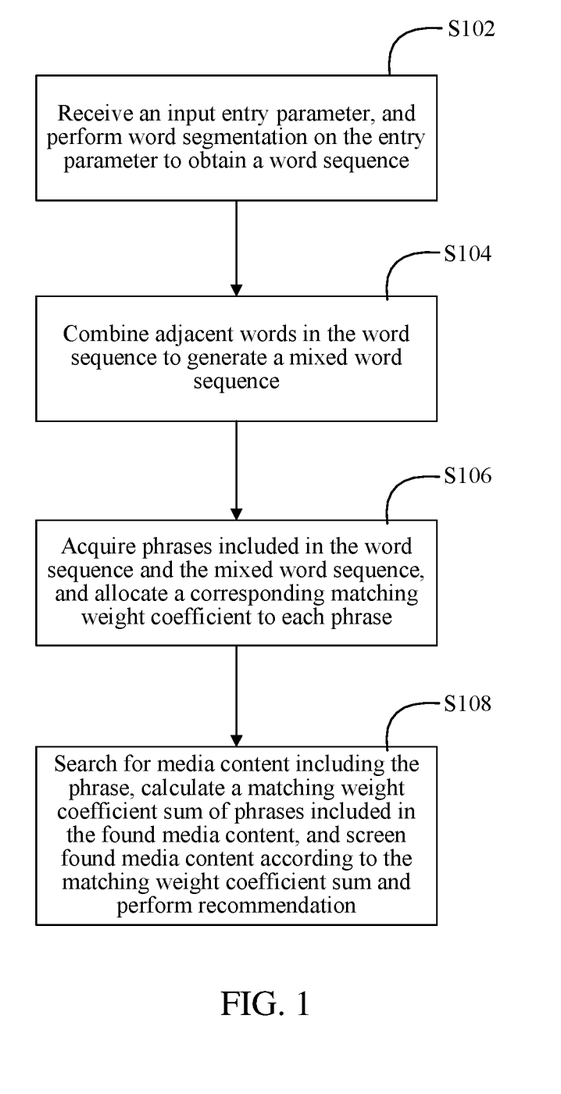
FIG. 1 is a flowchart of a media content recommendation method according to an embodiment.

Specifically, as shown in FIG. 1, the media content recommendation method may include:

Step S102: Receive an input entry parameter, and perform word segmentation on the entry parameter to obtain a word sequence, where the word sequence includes multiple sequentially sorted words.

The entry parameter is a conditional statement for reference during media content recommendation. In an embodiment, the step of receiving an input entry parameter may be specifically: receiving a media content browsing instruction, acquiring corresponding target media content, and extracting the entry parameter according to the target media content.

For example, in an application scenario corresponding to this embodiment, an application environment of this method is an online on-demand scenario of a video website. Multiple video links and corresponding video thumbnails are displayed on a page of the video website, and a user may send the media content browsing instruction to a server of the video website by using a browser by clicking on a video link on the webpage. The server of the video website may find a data stream of a corresponding video resource from a video database of the server according to the media content browsing instruction, and push the data stream to a browser terminal of the user.

In this application scenario, the target media content is the pushed video resource, and the extracted entry parameter is a name, an abstract, and/or remark information of the video resource. For example, if a name of a video demanded by the user in the video website is "a meow star folk plays cute to its owner", this title is input as the entry parameter for reference during media content recommendation.

In an application scenario in which an application environment is online reading, the target media content is text content (a literature work such as a novel or a poem) read by a user online. When a novel is clicked on for reading, the novel is the target media content, and an abstract of the novel may be extracted as the entry parameter for input.

In an application scenario in which an application environment is a forum, the target media content is a forum posting clicked on by a user to browse, and a subject or a main posting text of the forum posting may be extracted as the entry parameter for input.

In another embodiment, the entry parameter may also be a character string directly input by a user by using a client. For example, in an application scenario in which an application environment is a question and answer website, a user inputs a question to find answers to similar questions, and the question input by the user may be input as the entry parameter.

After the input entry parameter is acquired, word segmentation may be performed on a character string of the entry parameter.

Common word segmentation algorithms may be classified into three types.

1. Character Matching

This method is also referred to as a mechanical word segmentation method. In this method, a Chinese character string to be analyzed and entries in a "sufficiently large" machine dictionary are matched according to a policy; and if a character string is found in the dictionary, the matching succeeds (a word is identified). Depending on different scanning directions, the string matching word segmentation method may be classified into forward matching and reverse matching. Depending on a case in which matching is preferentially performed for a different length, the string matching word segmentation method may be classified into maximum (longest) matching and minimum (shortest) matching. Several common mechanical word segmentation methods are as follows:

1) forward maximum matching method (left-to-right direction);

2) reverse maximum matching method (right-to-left direction);

3) minimum segmentation (where a quantity of words obtained by segmenting each sentence is minimum); and 4) bidirectional maximum matching method (scanning is performed twice from left to right and from right to left).

The foregoing methods may further be combined, for example, the forward maximum matching method and the reverse maximum matching method may be combined to constitute a bidirectional matching method. Because Chinese is characterized by that a single character forms a word, generally, forward minimum matching and reverse minimum matching are rarely used. Generally, segmentation accuracy of reverse matching is slightly higher than that of forward matching, and an ambiguous phenomenon occurs less frequently. A statistical result shows that an error rate is 1/169 when only forward maximum matching is used, and an error rate is 1/245 when only reverse maximum matching is used. However, this accuracy is far from meeting an actual requirement. An actually used word segmentation system uses mechanical word segmentation as a preliminary segmentation means, and also needs to use various types of other language information to further improve segmentation accuracy.

In a method, a scanning manner is improved, which is referred to as characteristic scanning or sign segmentation, where some words with obvious characteristics in a character string to be analyzed are preferentially identified and obtained by segmentation; and by using these words as breakpoints, the original character string may be divided into smaller strings to further perform mechanical word segmentation, so as to reduce a matching error rate. In another method, word segmentation and part of speech are annotated and combined, abundant part of speech information is used to help word segmentation decision, and a word segmentation result is reversely tested and adjusted during an annotation process, so as to greatly improve segmentation accuracy.

2. Comprehension Method

In this word segmentation method, a computer is made to simulate comprehension of a sentence by people to achieve an effect of identifying a word. A basic idea thereof is performing syntax and semantic analyzing while performing word segmentation, and an ambiguous phenomenon is processed by using syntax information and semantic information. This word segmentation method usually includes three parts: A word segmentation subsystem, a syntax and semantic subsystem, and a general control part. Coordinated by the general control part, the word segmentation subsystem may obtain syntax information and semantic information related to words, sentences, and the like to determine word segmentation ambiguity, that is, the word segmentation subsystem simulates a process of comprehending a sentence by people.

3. Statistic Method

From the perspective of form, a phrase is a stable combination of characters; and therefore, the more frequently adjacent characters appear simultaneously in a context, the more possible the adjacent characters form a phrase. Therefore, the frequency or probability that characters appear adjacently can desirably reflect reliability of forming a phrase. Statistics on the frequency of combinations of characters that appear adjacently in a corpus may be collected, and mutual information of the characters may be calculated. Mutual information of two characters is defined, and the probability that two characters X and Y appear adjacently is calculated. Mutual information indicates the extent to which Chinese characters are closely combined. When the close extent is greater than a threshold, it may be regarded that the character combination may form a phrase. In this method, only statistics on the character combination frequency in a corpus needs to be collected, and a dictionary does not need to be segmented; and therefore, this method is also referred to as a dictionary-free word segmentation method or a statistical word selection method.

Common word segmentation frameworks include: SCWS, FudanNLP, ICTCLAS, HTTPCWS, CC-CEDICT, IK, Paoding, MMSEG4J, Pan Gu Segment, Jcseg, friso, and the like. The foregoing word segmentation frameworks may be used to perform word segmentation on the entry parameter to obtain phrases, but do not intend to constitute any limitation.

Step S104: Combine adjacent words in the word sequence to generate a mixed word sequence, where the mixed word sequence includes multiple sequentially sorted phrases.

Step S106: Acquire phrases included in the word sequence and the mixed word sequence, and allocate a matching weight coefficient to each phrase.

If the word sequence is [w1, w2, w3, . . . wn], phrases of mixed words are [w1w2, w2w3, w3w4, . . . wn−1 wn−2] if two adjacent words form a phrase in the mixed word sequence. In another embodiment, more than two adjacent words may also be used to generate the mixed word sequence, for example, other phrases of mixed words [w1w2w3, w2w3w4, . . . wn−2wn−1wn] may also be obtained in the foregoing example.

In the foregoing application scenario, for the entry parameter "meow star folk to its owner plays cute", a word sequence [meow, star, folk, to, its, owner, plays cute] may be first obtained; and correspondingly, a mixed word sequence formed with two adjacent words is [meow star, star folk, folk to, to its, its owner, its owner plays cute].

Phrases acquired from the word sequence and the subsequently generated mixed word sequence include "meow, star, folk, to, its, owner, plays cute, meow star, star folk, folk to, to its, its owner, its owner plays cute". After the phrases are obtained, a matching weight coefficient may be allocated to each phrase.

A matching weight coefficient allocated to a phrase is used to represent a weight of the phrase in a meaning expressed by the whole entry parameter. Preferably, a matching weight coefficient sum of the phrases may be normalized as 1, and a matching weight coefficient of each phrase represents a percentage of the phrase in the meaning expressed by the whole entry parameter, so as to facilitate comparison. A weight coefficient may be allocated to a phrase according to a part of speech type of the phrase, browsing times of the media content including the phrase, a matching quantity of the media content including the phrase, and a quantity of characters included in the phrase.

It should be noted that a matching weight coefficient of a phrase may include multiple parts. In this embodiment, a part of speech weight coefficient (where allocation is performed according to a part of speech type) and a semantic weight coefficient (where allocation is performed according to the browsing times of the media content including the phrase and a matching quantity of the media content including the phrase) may be included, that is, a sum of a part of speech weight coefficient and a semantic weight coefficient of a phrase constitutes a matching weight coefficient of the phrase. In another embodiment, constituents of a matching weight coefficient are not limited to the part of speech weight coefficient and the semantic weight coefficient, and a weight coefficient of another type may also be added as a reference vector according to actual requirements.

In an embodiment, a part of speech type of a phrase may be acquired, and a part of speech weight coefficient is allocated to the phrase according to the part of speech type of the phrase.

The part of speech type refers to that the phrase belongs to a content word (a noun, a verb, an adjective, a numeral, a quantifier, or a pronoun) or a function word (an adverb, a preposition, a conjunction, an auxiliary word, onomatopoetic word, or an interjection). More part of speech weight coefficients may be allocated to the content word than to the function word (or a part of speech weight coefficient of 0 is directly allocated to the function word), and a part of speech type of a phrase may be obtained by using the foregoing word segmentation tools.

Further, for phrases that are all content words, part of speech weight coefficients may further be allocated to the phrases according to types of a noun, a verb, an adjective, a numeral, a quantifier, and a pronoun.

For example, three part of speech weight coefficient grades corresponding to content words may be set, where a noun belongs to the first part of speech weight coefficient grade and has a relatively large part of speech weight coefficient, a verb and an adjective belong to the second part of speech weight coefficient grade and have ordinary part of speech weight coefficients, a numeral, a quantifier, and a pronoun belong to the third part of speech weight coefficient grade and have relatively small part of speech weight coefficients (or part of speech weight coefficients of a numeral, a quantifier, and a pronoun are directly set to 0; however, in some application scenarios sensitive to numbers, for example, an application scenario in which a title has a season number and an episode number of a television series, a quantifier may be upgraded to the second part of speech weight coefficient grade. That is, the grades may be set according to actual applications).

Further, for a noun phrase, two part of speech weight coefficient grades may further be set, where a people name or an organization name has a greater part of speech weight coefficient, and a noun of another type has a smaller part of speech weight coefficient.

For example, if a part of speech weight coefficient constitutes 70% of a preset matching weight coefficient of a phrase, a semantic weight coefficient constitutes 30%, a preset part of speech weight coefficient of a people name phrase or an organization name phrase is 1, a part of speech weight coefficient of an ordinary noun is 0.6 (that is, nouns are classified into two grades of 1 and 0.6), preset part of speech weight coefficients of a verb phrase and an adjective phrase are 0.4, and preset part of speech weight coefficients of a numeral phrase, a quantifier phrase, a pronoun phrase, and other function words phrases are 0, for the phrases "meow, star, folk, to, its owner, plays cute, meow star, star folk, folk to, to its, its owner, its owner plays cute" extracted from the entry parameter, part of speech weight coefficients of the phrases are separately: 0, 0.6, 0.6, 0, 0.6, 0.4, 0.6, 0.6, 0, 0, and 0.4.

Preferably, the extracted phrases may be filtered in advance according to part of speech types to filter out a phrase having a smaller part of speech weight coefficient. In the foregoing example, phrases (which are usually adverbs) including function words "meow" and "to" in the phrases may be filtered out, and phrases "meow", "to", "folk to", and "to its owner" are filtered out, so as to reduce operations on meaningless words and improve the execution efficiency.

In an embodiment, the step of allocating a corresponding matching weight coefficient to each phrase further includes: acquiring browsing times of the media content including the phrase and a matching quantity of the media content including the phrase, and allocating a semantic weight coefficient to the phrase according to the browsing times and the matching quantity of the phrase.

A ratio of the browsing times $N_{CLICK}$ of the media content including the phrase to the matching quantity $N_{DF}$ of the media content including the phrase may be calculated, and the semantic weight coefficient may be allocated to the phrase according to $N_{CLICK}/N_{DF}$ (it may be a linear transformation or a nonlinear transformation of this ratio) of the phrase.

For example, for phrases such as "star" and "folk", a value of $N_{DF}$ is usually large, and a value of $N_{CLICK}$ is relatively small; and therefore, the final $N_{CLICK}/N_{DF}$ or a linear transformation of $N_{CLICK}/N_{DF}$ is also relatively small. Therefore, for the phrases such as "star" and "folk", semantic weight coefficients of the phrases are relatively small. In this embodiment, phrases may be filtered out according to browsing times and a matching quantity of the phrases. That is, a phrase whose $N_{CLICK}/N_{DF}$ is less than a threshold may be filtered out, for example, "star", "folk", and "its owner" may be filtered out.

After the foregoing various types of filtering, remaining phrases "plays cute", "meow star", "star folk", and "its owner plays cute" may be obtained. If semantic weight coefficients of the phrases that are obtained after calculation and correspond to $N_{CLICK}/N_{DF}$ of the phrases are: 0.3, 0.7, 0.6, and 0.2, and if a part of speech weight coefficient constitutes 70% of a matching weight coefficient, and a semantic weight coefficient constitutes 30% as described above, matching weight coefficients of "plays cute", "meow star", "star folk", and "its owner plays cute" are respectively 0.4×0.3, 0.6×0.7, 0.6×0.6, and 0.4×0.2, that is, 0.12, 0.42, 0.36, and 0.08. After normalization, the matching weight coefficients of "plays cute", "meow star", "star folk", and "its owner plays cute" are respectively: 0.122, 0.428, 0.367, and 0.082, and matching weight coefficients of other phrases are 0.

It should be noted that the foregoing solution of defining and calculating values of a part of speech weight coefficient and a semantic weight coefficient is only an exemplary description for describing a solution for allocating a matching weight coefficient, and the foregoing definition and calculation manner does not constitute any limitation in another embodiment.

Step S108: Search for media content including the phrase, calculate a matching weight coefficient sum of phrases included in the found media content, and screen the found media content according to the matching weight coefficient sum and perform recommendation. Specifically, the found media content is sorted in a descending order of the matching weight coefficient sums, and media content whose matching weight coefficient sum is sorted in the first place is recommended.

In this embodiment, to facilitate search and improve the search efficiency, an inverted index in which a phrase corresponds to media content stored in a media content database may be created in advance, and media content corresponding to an extracted phrase is searched for according to the inverted index.

The inverted index derives from an actual application in which a record needs to be searched for according to an attribute value. Each item in an index table includes an attribute value and addresses of records having the attribute value.

Figure 2:
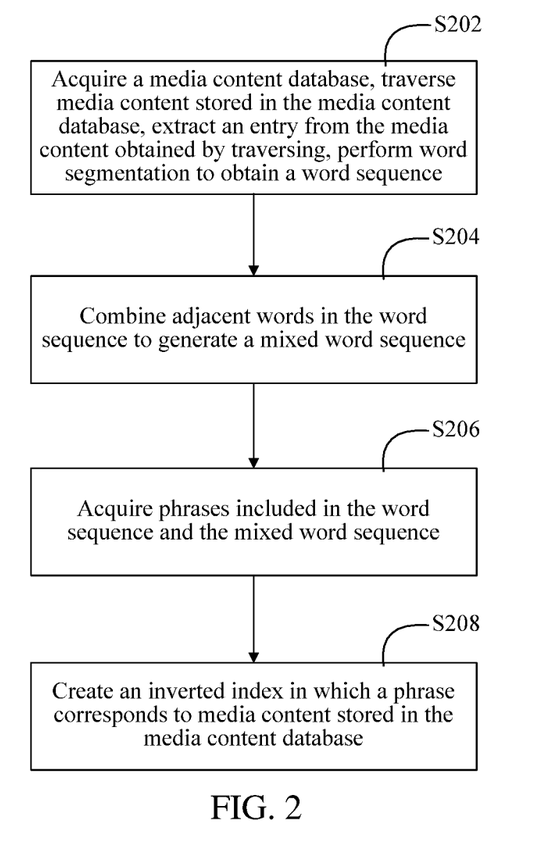
FIG. 2 is a flowchart of a method for creating an inverted index in which a phrase corresponds to media content according to an embodiment.

In this embodiment, as shown in FIG. 2, steps of creating the inverted index may be specifically:

Step S202: Acquire a media content database, traverse media content stored in the media content database, extract an entry from the media content obtained by traversing, perform word segmentation to obtain a word sequence.

Step S204: Combine adjacent words in the word sequence to generate a mixed word sequence.

Step S206: Acquire phrases included in the word sequence and the mixed word sequence.

Step S208: Create an inverted index in which a phrase corresponds to media content stored in the media content database.

That is, for a video database, a title of each video in the video database may be extracted, word segmentation and mixing is then performed on the title, and for each obtained phrase, a link address of the video may be added to the inverted index to correspond to the phrase.

For example, if the video database has 100 videos (only an example is used to describe the inverted index, and there are actually more than 100 videos), after word segmentation and mixing is performed on a title of each video, 56 videos whose titles include "meow star" are obtained, and in this case, the index value "meow star" corresponds to addresses of the 56 videos.

Preferably, before the step of searching for media content including a phrase, the method further includes: filtering the phrases according to matching weight coefficients of the phrases.

In the foregoing example, a phrase whose matching weight coefficient is less than a threshold may be filtered out, and no search is performed. For example, phrases whose matching weight coefficients are 0 such as "star" and "folk" may be filtered out, and search is performed for only four phrases of "plays cute", "meow star", "star folk", and "its owner plays cute", so as to reduce query time and improve efficiency.

Preferably, a synonym of an extracted phrase may further be acquired, and media content including the synonym of the phrase is searched for.

In the step of acquiring a matching weight coefficient sum of phrases in the found media content, it may be determined whether a synonym of a phrase is included in the found media content; and if yes, it is determined that the media content includes the phrase.

For example, in an application scenario, if extracted phrases are "cooking", "potato", and "method", search is also performed for the synonym "spud" of the phrase "potato". If media content of "spud cooking method" is obtained by performing search on the phrase "cooking", because "spud" in the media content is a synonym of "potato", it is also regarded that the phrase "potato" is included, that is, included in the media content.

After media content including a phrase is found, a matching weight coefficient sum of phrases included in the found media content can be acquired, where the matching weight coefficient sum of the included phrases is the extent to which the media content matches the input entry parameter.

For example, if a title of a found video is "a woof star folk plays cute", two phrases of "plays cute" and "star folk" are included, and the extent to which the video matches the input entry parameter is 0.122 (plays cute)+0.367 (star folk)=0.489. For example, if a title of another video is "a meow star folk plays cute", phrases of "plays cute", "meow star", and "star folk" are included, and the extent to which the video matches the input entry parameter is 0.122 (plays cute)+0.367 (star folk)+0.428 (meow star)=0.917.

After the extent to which the found media content matches the input entry parameter (that is, a matching weight coefficient sum of included phrases) is calculated as described above, sorting may be performed according to values of matching extent, and media content having greater matching extent is recommended to a user. In the foregoing example, the video whose title is "a meow star folk plays cute" may be preferentially recommended to a user, that is, sorted in the first place among recommended videos.

In this embodiment, before the step of recommending found media content, the method further includes:

acquiring a time parameter and a type parameter of target media content, and screening the found media content according to the time parameter and the type parameter of the target media content.

In an application scenario corresponding to this embodiment, the target media content is a video, a literature work, or the like that a user is browsing as described above. The type parameter is type information of a media field of the target media content, for example, videos may be classified into news, short films, casually made videos, and the like. The time parameter is a publishing timestamp or a creation year of the target media content, for example, a time parameter of a news video is a publishing timestamp of the news video, and a time parameter of a short film or a literature work such as a novel is a creation year of the short film or the literature work.

For news media content, media content having a relatively new publishing timestamp may be selected by screening for recommendation; and for a short film or a literature work such as a novel, media content whose creation year is similar to that of the target media content may be selected by screening for recommendation.

Specifically, a time matching coefficient may be added based on the foregoing matching weight coefficient sum, and recommendation is then performed after sorting is performed according to values of matching weight coefficient sums and time matching coefficient sums.

In a calculation method, a time matching coefficient may be generated according to a difference between time parameters of the found media content and the target media content. For example, for a news video, it may be set that a time matching coefficient is 0 when a publishing timestamp difference exceeds 10 days, and 0.1 is reduced each day when a publishing timestamp difference is within 10 days. In this case, if a found news video is published 3 days ago, a time matching coefficient of the video is 0.7.

If a ratio of a normalized matching weight coefficient sum (the foregoing matching extent) to a normalized time matching coefficient is 6:4, and if a matching weight coefficient sum corresponding to the found media content is 0.8, comprehensive extent to which the found media content matches a news video that a user is browsing is 0.8×0.6+0.4×0.7=0.76. In this case, when the found media content is finally selected to recommend to the user, sorting may be performed according to the comprehensive matching extent, and media content having a higher comprehensive matching extent grade is recommended to the user.

Figure 3:
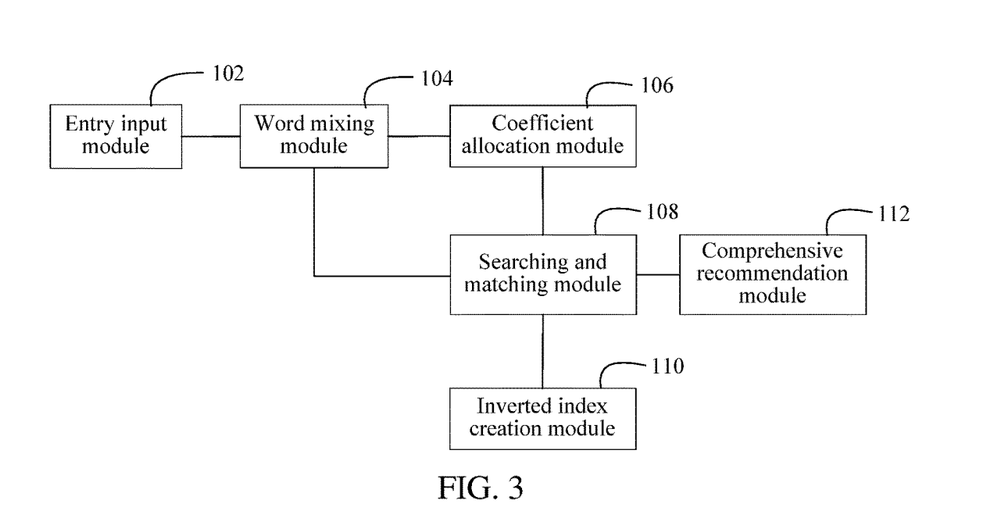
FIG. 3 is a schematic structural diagram of a media content recommendation apparatus according to an embodiment.

In an embodiment, as shown in FIG. 3, a media content recommendation apparatus includes:

the entry input module 102, configured to receive an input entry parameter, and perform word segmentation on the entry parameter to obtain a word sequence;

the word mixing module 104, configured to combine adjacent words in the word sequence to generate a mixed word sequence;

the coefficient allocation module 106, configured to acquire phrases included in the word sequence and the mixed word sequence, and allocate a corresponding matching weight coefficient to each phrase; and the searching and matching module 108, configured to search for media content including the phrase; acquire a matching weight coefficient sum of phrases included in the found media content; and screen the found media content according to the matching weight coefficient sum and perform recommendation.

In an embodiment, as shown in FIG. 3, the media content recommendation apparatus further includes an inverted index creation module 110, configured to acquire a media content database, traverse media content stored in the media content database, extract an entry from the media content obtained by traversing, and perform word segmentation to obtain a word sequence; combine adjacent words in the word sequence to generate a mixed word sequence; acquire phrases included in the word sequence and the mixed word sequence; and create an inverted index in which a phrase corresponds to media content stored in the media content database.

The searching and matching module 108 is further configured to search the inverted index for media content corresponding to the phrase.

In an embodiment, the coefficient allocation module 106 is further configured to acquire a part of speech type of the phrase, and allocate a part of speech weight coefficient to the phrase according to the part of speech type of the phrase, where the matching weight coefficient includes the part of speech weight coefficient.

In an embodiment, the coefficient allocation module 106 is further configured to acquire browsing times of the media content including the phrase and a matching quantity of the media content including the phrase; and allocate a semantic weight coefficient to the phrase according to the browsing times and the matching quantity of the phrase, where the matching weight coefficient includes the semantic weight coefficient.

In an embodiment, the coefficient allocation module 106 is further configured to filter the phrases according to browsing times and matching quantities of the phrases.

In an embodiment, the searching and matching module 108 is further configured to filter the phrases according to the matching weight coefficients of the phrases.

In an embodiment, the entry input module 102 is configured to receive a media content browsing instruction, acquire corresponding target media content, and extract an entry parameter according to the target media content.

In an embodiment, as shown in FIG. 3, the media content recommendation apparatus further includes a comprehensive recommendation module 112, configured to acquire a time parameter and a type parameter of the target media content, and screen the found media content according to the time parameter and the type parameter of the target media content.

In an embodiment, the searching and matching module 108 is further configured to acquire a synonym of the phrase, and search for media content including the synonym of the phrase.

In this embodiment, the searching and matching module 108 is further configured to acquire the synonym of the phrase, and determine whether the synonym of the phrase is included in the found media content; and if yes, determine that the media content includes the phrase.

In the foregoing media content recommendation method and apparatus, word segmentation is first performed on an input entry parameter by using a common word segmentation means, and words are then mixed by connecting adjacent words to generate a new word. When corresponding media content is matched according to a phrase extracted from the entry parameter, not only relevance between word segmentation and the media content is considered, but also relevance between a new word generated after mixing and the media content is considered. In this way, in a media field having many new network vocabularies, media content that is highly related to entry information including a new word and also includes the new word can also be recommended to a user. Therefore, compared with a solution in the conventional technology in which only simple word segmentation is used as matching reference, recommendation accuracy is improved.

Figure 4:
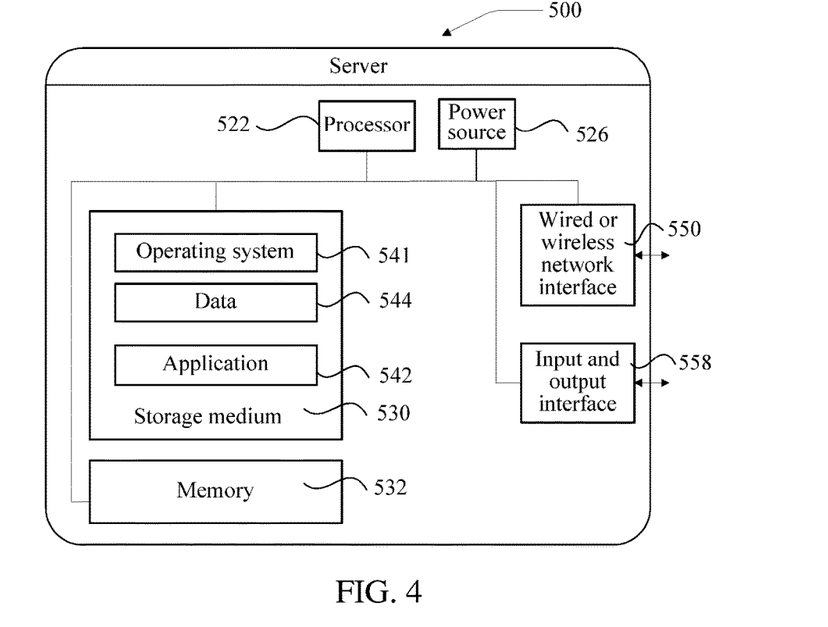
FIG. 4 is a hardware environment diagram of a server that executes the foregoing media content recommendation method according to an embodiment.

In an embodiment, as shown in FIG. 4, a schematic structural diagram of a reverse proxy node that can execute the foregoing media content recommendation method is provided, where a structure of the service node is applicable to a service node of an Internet application. Depending on different configurations or performances, a service node 500 may be greatly different, and may include one or more processors 522 such as a central processing unit (CPU), a memory 532, and one or more storage media 530 (for example, one or more mass storage devices) for storing an application 542 or data 544. The memory 532 and the storage medium 530 may be temporary storage or persistent storage. A program stored in the storage medium 530 may include one or more modules (for example, the entry input module 102, the word mixing module 104, the coefficient allocation module 106, and the searching and matching module 108 that are described above), and each module may include a series of instruction operations in the service node. Further, the processor 522 may be set to communicate with the storage medium 530, and executes, on the service node 500, a series of instruction operations in the storage medium 530. The service node 500 may further include one or more power sources 526, one or more wired or wireless network interfaces 550, one or more input and output interfaces 558, and/or one or more operating systems 541 such as Windows Server™, Mac OS X™, Unix™, Linux™, FreeBSD™, or the like.

The steps in the embodiment shown in FIG. 1 may be based on the structure of the server shown in FIG. 4. A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

The foregoing embodiments only represent several implementation manners of the present disclosure; and descriptions thereof are specific and detailed, but shall not be understood as limitation to the patent scope of the present disclosure. It should be noted that a person of ordinary skill in the art may further make variations and improvements without departing from the idea of the present disclosure, and the variations and improvements all fall within the protection scope of the present disclosure. Therefore, the patent protection scope of the present disclosure shall be subject to the appended claims.

What is claimed is:

1. A media content recommendation method executed by a computer system, comprising:
   receiving an input entry parameter;
   performing word segmentation on the entry parameter to obtain a word sequence, the word sequence comprising multiple sequentially sorted words;
   combining adjacent words in the word sequence to generate a mixed word sequence, the mixed word sequence comprising multiple sequentially sorted phrases;
   acquiring phrases comprised in the word sequence and the mixed word sequence;
   for each of the phrases, allocating a matching weight coefficient to each phrase, the matching weight coefficient of a phrase being used to represent a percentage of the phrase in a meaning expressed by the whole entry parameter, searching for media content comprising the phrase;
   calculating a matching weight coefficient sum of phrases comprised in the found media content; and
   sorting the found media content in a descending order of matching weight coefficient sums, and recommending media content whose matching weight coefficient sum is sorted in the first place.

2. The method according to claim 1, wherein the method further comprises:
   acquiring a media content database, traversing media content stored in the media content database, extracting an entry from the media content obtained by traversing, and performing word segmentation to obtain a word sequence;
   combining adjacent words in the word sequence to generate a mixed word sequence;
   acquiring phrases comprised in the word sequence and the mixed word sequence; and
   creating an inverted index in which a phrase corresponds to media content stored in the media content database.

3. The method according to claim 2, wherein the searching for media content comprising the phrase comprises:
   searching the inverted index for media content corresponding to the phrase.

4. The method according to claim 1, wherein the allocating a matching weight coefficient to each phrase comprises:
   acquiring a part of speech type of the phrase, and allocating a part of speech weight coefficient to the phrase according to the part of speech type of the phrase, wherein the matching weight coefficient comprises the part of speech weight coefficient.

5. The method according to claim 1, wherein the allocating a matching weight coefficient to each phrase comprises:
   acquiring browsing times of the media content comprising the phrase and a matching quantity of the media content comprising the phrase; and
   allocating a semantic weight coefficient to the phrase according to the browsing times and the matching quantity of the phrase, wherein the matching weight coefficient comprises the semantic weight coefficient.

6. The method according to claim 5, wherein after the acquiring browsing times of the media content comprising the phrase and a matching quantity of the media content comprising the phrase, the method further comprises:
filtering the phrases according to browsing times and matching quantities of the phrases, and reserving a phrase whose ratio of browsing times to a matching quantity is greater than or equal to a threshold.

7. The method according to claim 1, wherein before the searching for media content comprising the phrase, the method further comprises:
filtering the phrases according to the matching weight coefficients of the phrases, and filtering out a phrase whose matching weight coefficient is less than a threshold.

8. The method according to claim 1, wherein the receiving an input entry parameter comprises:
receiving a media content browsing instruction, acquiring corresponding target media content, and extracting an entry parameter of the target media content.

9. The method according to claim 8, wherein before the recommending media content whose matching weight coefficient sum is sorted in the first place, the method further comprises:
acquiring a time parameter and a type parameter of the target media content, and screening the found media content according to the time parameter and the type parameter of the target media content.

10. The method according to claim 1, wherein the searching for media content comprising the phrase comprises:
acquiring a synonym of the phrase, and searching for media content comprising the synonym of the phrase; and
the calculating a matching weight coefficient sum of phrases comprised in the found media content comprises:
acquiring the synonym of the phrase, and determining whether the synonym of the phrase is comprised in the found media content; and if yes, determining that the media content comprises the phrase.

11. A media content recommendation apparatus, comprising:
a processor and a memory storing computer-readable instructions executable by the processor to:
receive an input entry parameter, and perform word segmentation on the entry parameter to obtain a word sequence, the word sequence comprising multiple sequentially sorted words;
combine adjacent words in the word sequence to generate a mixed word sequence, the mixed word sequence comprising multiple sequentially sorted phrases;
acquire phrases comprised in the word sequence and the mixed word sequence;
for each of the phrases, allocate a matching weight coefficient to each phrase, the matching weight coefficient being used to represent a percentage of the phrase in a meaning expressed by the whole entry parameter, search for media content comprising the phrase;
calculate a matching weight coefficient sum of phrases comprised in the found media content; and sort the found media content in a descending order of matching weight coefficient sums, and recommend media content whose matching weight coefficient sum is sorted in the first place.

12. The apparatus according to claim 11, wherein the computer-readable instructions executable by the processor to acquire a media content database, traverse media content stored in the media content database, extract an entry from the media content obtained by traversing, and perform word segmentation to obtain a word sequence; combine adjacent words in the word sequence to generate a mixed word sequence; acquire phrases comprised in the word sequence and the mixed word sequence; and create an inverted index in which a phrase corresponds to media content stored in the media content database.

13. The apparatus according to claim 11, wherein the computer-readable instructions executable by the processor to search the inverted index for media content corresponding to the phrase.

14. The apparatus according to claim 11, wherein the computer-readable instructions executable by the processor to acquire a part of speech type of the phrase, and allocate a part of speech weight coefficient to the phrase according to the part of speech type of the phrase, wherein the matching weight coefficient comprises the part of speech weight coefficient.

15. The apparatus according to claim 11, wherein the computer-readable instructions executable by the processor to acquire browsing times of the media content comprising the phrase and a matching quantity of the media content comprising the phrase; and allocate a semantic weight coefficient to the phrase according to the browsing times and the matching quantity of the phrase, wherein the matching weight coefficient comprises the semantic weight coefficient.

16. The apparatus according to claim 15, wherein the computer-readable instructions executable by the processor to filter the phrases according to browsing times and matching quantities of the phrases, and reserve a phrase whose ratio of browsing times to a matching quantity is greater than or equal to a threshold.

17. The apparatus according to claim 11, wherein the s computer-readable instructions executable by the processor to filter the phrases according to the matching weight coefficients of the phrases, and filter out a phrase whose matching weight coefficient is less than a threshold.

18. The apparatus according to claim 11, wherein the computer-readable instructions executable by the processor to receive a media content browsing instruction, acquire corresponding target media content, and extract an entry parameter of the target media content.

19. The apparatus according to claim 18, wherein the computer-readable instructions executable by the processor to acquire a time parameter and a type parameter of the target media content, and screen the found media content according to the time parameter and the type parameter of the target media content.

20. The apparatus according to claim 11, wherein the computer-readable instructions executable by the processor to acquire a synonym of the phrase, and search for media content comprising the synonym of the phrase; and
acquire the synonym of the phrase, and determine whether the synonym of the phrase is comprised in the found media content; and if yes, determine that the media content comprises the phrase.

21. A non-transitory computer-readable medium storing instructions which, when executed by one or more processors, to:
receive an input entry parameter;
perform word segmentation on the entry parameter to obtain a word sequence, the word sequence comprising multiple sequentially sorted words;

combine adjacent words in the word sequence to generate a mixed word sequence, the mixed word sequence comprising multiple sequentially sorted phrases;

acquire phrases comprised in the word sequence and the mixed word sequence;

for each of the phrases, allocate a matching weight coefficient to each phrase, the matching weight coefficient being used to represent a percentage of the phrase in a meaning expressed by the whole entry parameter, search for media content comprising the phrase;

calculate a matching weight coefficient sum of phrases comprised in the found media content; and sort the found media content in a descending order of matching weight coefficient sums, and recommend media content whose matching weight coefficient sum is sorted in the first place.

* * * * *